(12) United States Patent
Chiu et al.

(10) Patent No.: US 8,413,336 B2
(45) Date of Patent: Apr. 9, 2013

(54) STRUCTURE OF A CUTTING TOOL

(75) Inventors: Jack Chiu, Taichung (TW); Sheng-Chih Chiu, Taichung (TW)

(73) Assignee: Asian First Refrigeration Corporation, Taichung (TW)

( * ) Notice: Subject to any disclaimer, the term of this patent is extended or adjusted under 35 U.S.C. 154(b) by 272 days.

(21) Appl. No.: 13/072,113

(22) Filed: Mar. 25, 2011

(65) Prior Publication Data

US 2012/0023751 A1   Feb. 2, 2012

(30) Foreign Application Priority Data

Jul. 30, 2010  (TW) ............................... 99214693 U

(51) Int. Cl.
*B23D 21/08* (2006.01)
(52) U.S. Cl.
USPC .................................. 30/101; 30/102; 30/92
(58) Field of Classification Search .......... 30/92, 93–95, 30/98, 101, 102, 90.1–90.3, 91.2
See application file for complete search history.

(56) References Cited

U.S. PATENT DOCUMENTS

| | | | | | |
|---|---|---|---|---|---|
| 274,631 | A | * | 3/1883 | Miller | 30/101 |
| 463,102 | A | * | 11/1891 | Courtemanche | 30/101 |
| 1,428,288 | A | * | 9/1922 | Keatley | 30/101 |
| 1,699,027 | A | * | 1/1929 | Scott | 30/99 |
| 2,865,098 | A | * | 12/1958 | Joseph et al. | 30/101 |
| 2,888,743 | A | * | 6/1959 | Arnes | 30/101 |
| 2,993,274 | A | * | 7/1961 | Dirks | 30/123 |
| 3,117,375 | A | * | 1/1964 | Meese | 30/96 |
| 3,196,652 | A | * | 7/1965 | Meese | 72/70 |
| 3,650,547 | A | * | 3/1972 | Tickett | 285/3 |
| 5,099,577 | A | * | 3/1992 | Hutt | 30/101 |
| 5,160,340 | A | * | 11/1992 | Gary et al. | 606/176 |
| 5,315,759 | A | * | 5/1994 | Mashata | 30/97 |
| 5,414,932 | A | * | 5/1995 | Azkona | 30/96 |
| 5,475,924 | A | * | 12/1995 | McDaniel | 30/102 |
| 5,515,609 | A | * | 5/1996 | Sperti | 30/101 |
| 5,943,778 | A | * | 8/1999 | Alana | 30/101 |
| 6,237,449 | B1 | * | 5/2001 | Orlosky | 81/360 |
| 6,658,739 | B1 | * | 12/2003 | Huang | 30/96 |
| 6,739,055 | B2 | * | 5/2004 | Lee | 30/98 |
| 2006/0059692 | A1 | * | 3/2006 | Lee | 30/101 |
| 2009/0049697 | A1 | * | 2/2009 | Williams | 30/101 |
| 2009/0090008 | A1 | * | 4/2009 | Nagasoe | 30/101 |

* cited by examiner

*Primary Examiner* — Sean Michalski
(74) *Attorney, Agent, or Firm* — Wang Law Firm, Inc.; Li K. Wang; Stephen Hsu

(57) ABSTRACT

An improved structure of a cutting tool includes a body, a moving base, and a roller base. The body has a track groove whose one side is extended upward with a stopping wall. The moving base is disposed to slide in the track groove and mounted with a cutting wheel. The moving base is connected with a transmission element so as to move along the track groove. The roller base is disposed between the moving base and the stopping wall. More than one elastic element is disposed between the roller base and the stopping wall. The elastic elements generate a deviation when the roller base is under a force. The roller base has at least two rollers corresponding to the cutting wheel.

5 Claims, 5 Drawing Sheets

STRUCTURE OF A CUTTING TOOL

BACKGROUND OF THE INVENTION

1. Field of Invention

The invention relates to a hand tool for cutting pipes and, in particular, to an improved structure of the cutting tool.

2. Related Art

FIG. 5 shows a conventional pipe cutting tool. By turning a knob 51, a rolling blade 52 moves toward two rollers 53 to hold a pipe 54. As one keeps turning the knob 51, the rolling blade 52 then exerts a force and cuts through the pipe 54.

However, the rollers 53 are fixed on one side of the cutting tool in this conventional structure. Therefore, it provides only one holding position that cannot be fine-tuned by the user according to the size of the pipe 54 or the magnitude of the imposed force. Such a holding effect is not perfect. When the rolling blade 52 and the two rollers 53 cannot accurately hold and position the pipe 54, it becomes harder for cutting. More dangerously, the pipe 54 may slip out of the rolling blade 52 and the two rollers 53.

SUMMARY OF THE INVENTION

In view of the foregoing, the invention provides an improved structure of a cutting tool.

One objective of the invention is to provide an improved structure of a cutting tool having a simpler structure, easier to assemble, and providing a better pipe positioning effect.

Another objective of the invention is to provide an improved structure of a cutting tool for quickly holding a pipe.

To achieve the above-mentioned objectives, the disclosed structure includes: a body, a moving base, and a roller base.

The body has a track groove whose one side is extended upward with a stopping wall. The moving base is disposed to slide in the track groove and mounted with a cutting wheel. The moving base is connected with a transmission element so as to move along the track groove. The roller base is disposed between the moving base and the stopping wall. More than one elastic element is disposed between the roller base and the stopping wall. The elastic elements generate a deviation when the roller base is under a force. The roller base has at least two rollers corresponding to the cutting wheel.

The two sidewalls of the body are opened with a sliding groove, respectively, corresponding to the track groove. The roller base has a connecting hole corresponding to the position of the two sliding grooves of the body. The connecting holes are provided with a limiting element, respectively. The outer diameter of the limiting element is smaller than the diameter of the sliding groove. The two limiting elements protrude from the corresponding sliding grooves. The limiting elements of the roller base are in the sliding grooves of the body to restrict the deviation range of the roller base.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein.

DETAILED DESCRIPTION OF THE INVENTION

The present invention will be apparent from the following detailed description, which proceeds with reference to the accompanying drawings, wherein the same references relate to the same elements.

Figure 1:
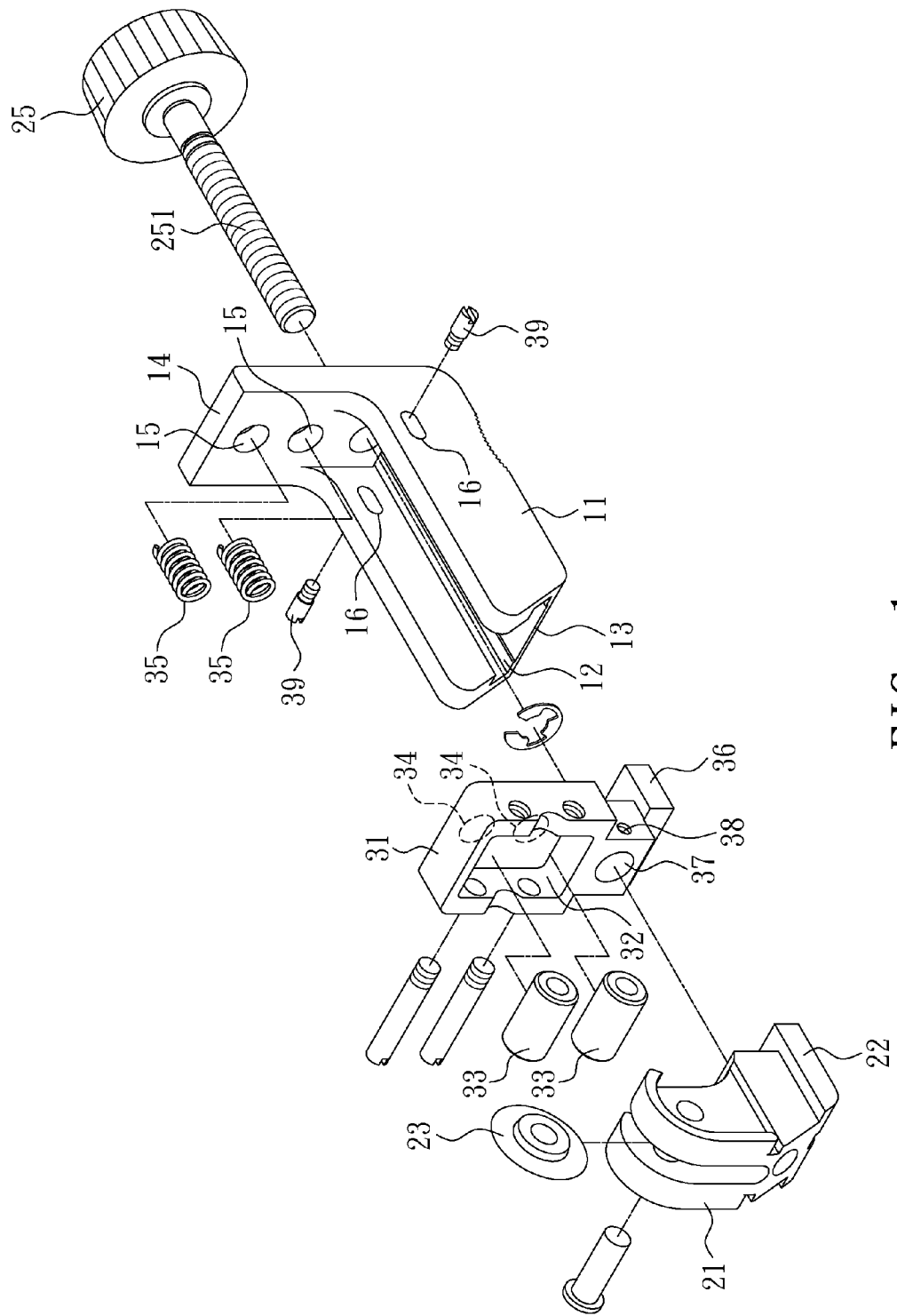
FIG. 1 is a three-dimensional exploded view of the invention.
Figure 2:
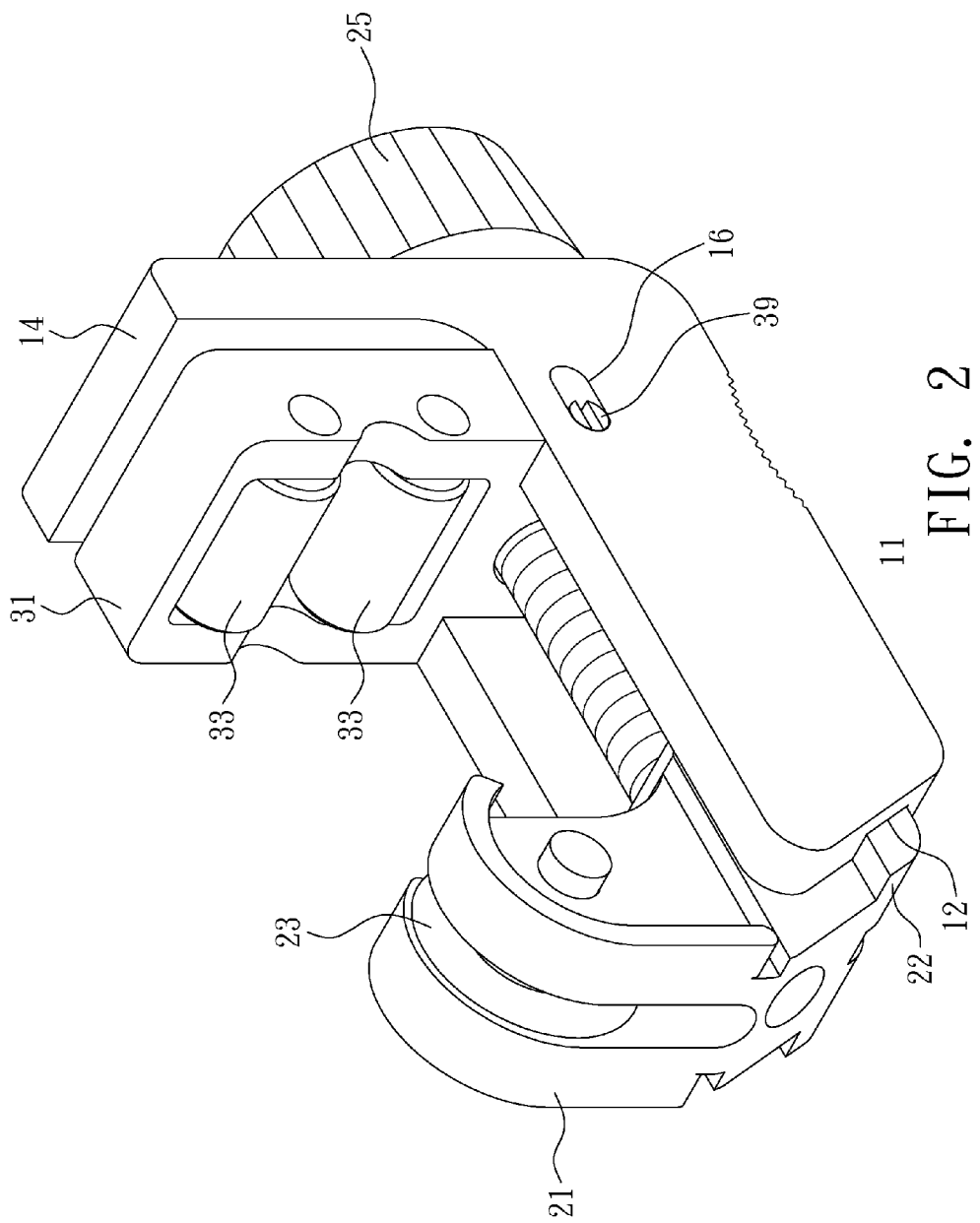
FIG. 2 is a three-dimensional view of the invention after assembly.
Figure 3:
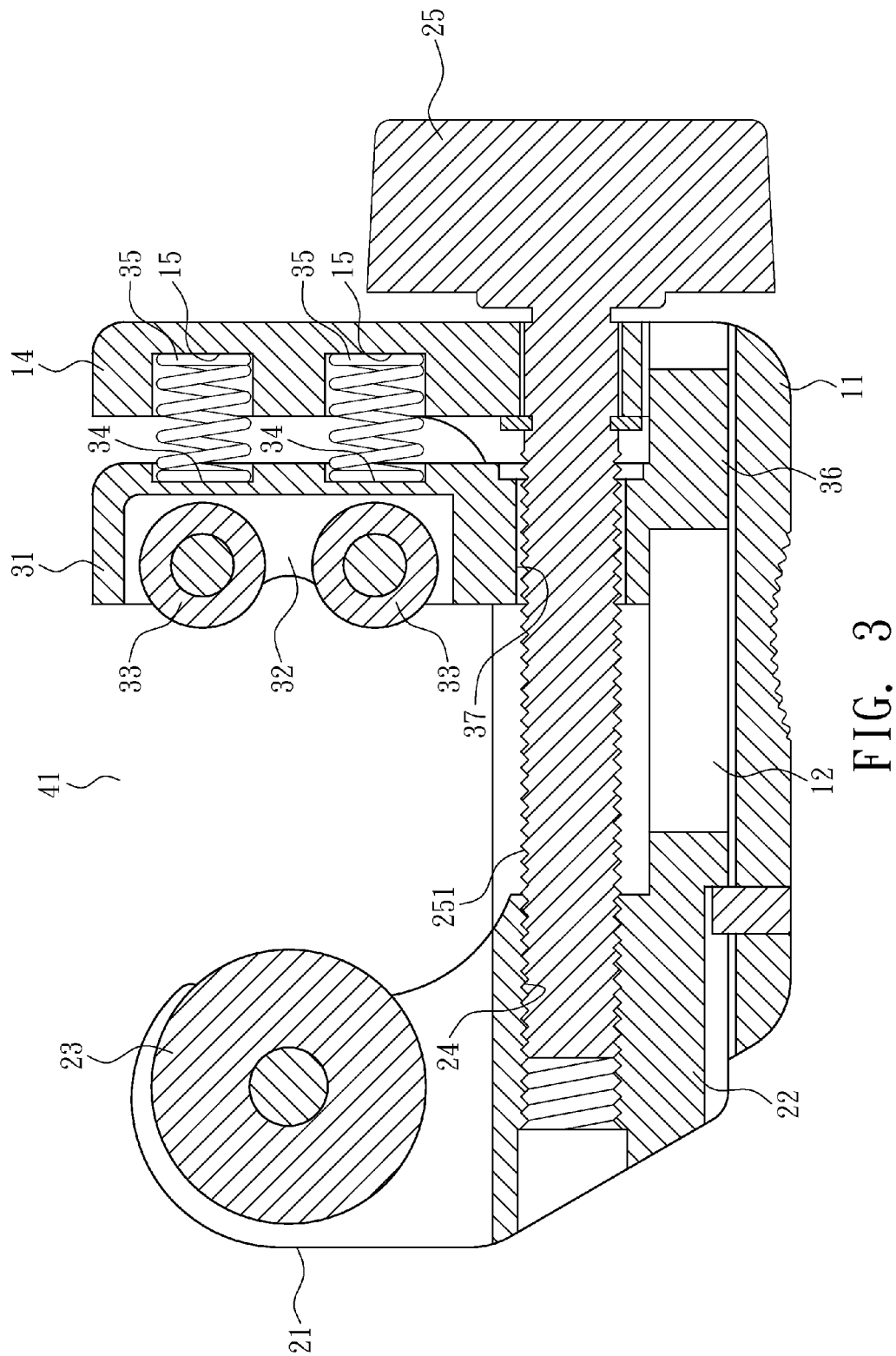
FIG. 3 is a schematic view showing the structure of the invention.

Please refer to FIGS. 1 to 3. An improved structure of a cutting tool according to the invention includes a body 11, a moving base 21, and a roller base 31.

The bottom of the body 11 has a track groove 12 extending in the transverse direction. One side of the track groove 12 is formed with an opening in communications with the exterior. The other side is extended upward with a stopping wall 14. The end surface of the stopping wall 14 facing the track groove 12 is formed with two recesses 15. A sliding groove 16 is formed on the two sidewalls of the body 11 opposite to the track groove 12.

The bottom of the moving base 21 is formed with a sliding part 22 to be mounted in the track groove 12. The moving base 21 slides in the track groove 12 of the body 11 via the sliding part 22. The top part of the moving base 21 is provided with a cutting wheel 23. The moving base 21 is further formed with a screw hole 24 along the axial direction of the track groove 12. A transmission element 25 has an outer thread part 251 corresponding to the screw hole 24. The transmission element 25 penetrates via the stopping wall 14 of the body 11 into the track groove 12 and connects to the screw hole 24 of the moving base 21. As the transmission element 25 turns, the moving base 21 is driven by the transmission element 25 to move along the axial direction of the track groove 12.

The roller base 31 is disposed between the moving base 21 and the stopping wall 14 of the body 11. The end surface of the roller base 31 facing the moving base 21 is formed with an accommodating space 32. The accommodating space 32 is mounted with two rollers 33 opposite to the cutting wheel 23. The end surface of the roller base 31 facing the stopping wall 14 is provided with a mounting part 34 corresponding to the two recesses 15. An elastic element 35 is disposed between the opposite recesses 15 and the mounting part 34, respectively. One end of each of the two elastic elements 35 urges against the corresponding recess 15 of the stopping wall 14. The other end urges against the mounting part 34 of the roller base 31. When the roller base 31 is imposed by a force, there is a corresponding deviation.

In this embodiment, the bottom of the roller base 31 further has a connecting part 36 to be correspondingly mounted in the track groove 12 of the body 11. The connecting part 36 is formed with a through hole 37 along the axial direction of the track groove 12. The transmission element 25 goes through the through hole 37 of the roller base 31 and connects to the screw hole 24 of the moving base 21. A connecting hole 38 is formed at the position of the roller base 31 opposite to the two sliding grooves 16 of the body 11. The two connecting holes 38 have a limiting element 39, respectively. The outer diameter of the limiting element 39 is smaller than the diameter of the sliding groove 16. The two limiting elements 39 protrude from the corresponding sliding grooves 16 and are mounted in the sliding grooves 16 of the body 11 via the limiting elements 39 of the roller base 31, thereby restricting the deviation range of the roller 31.

Figure 4:
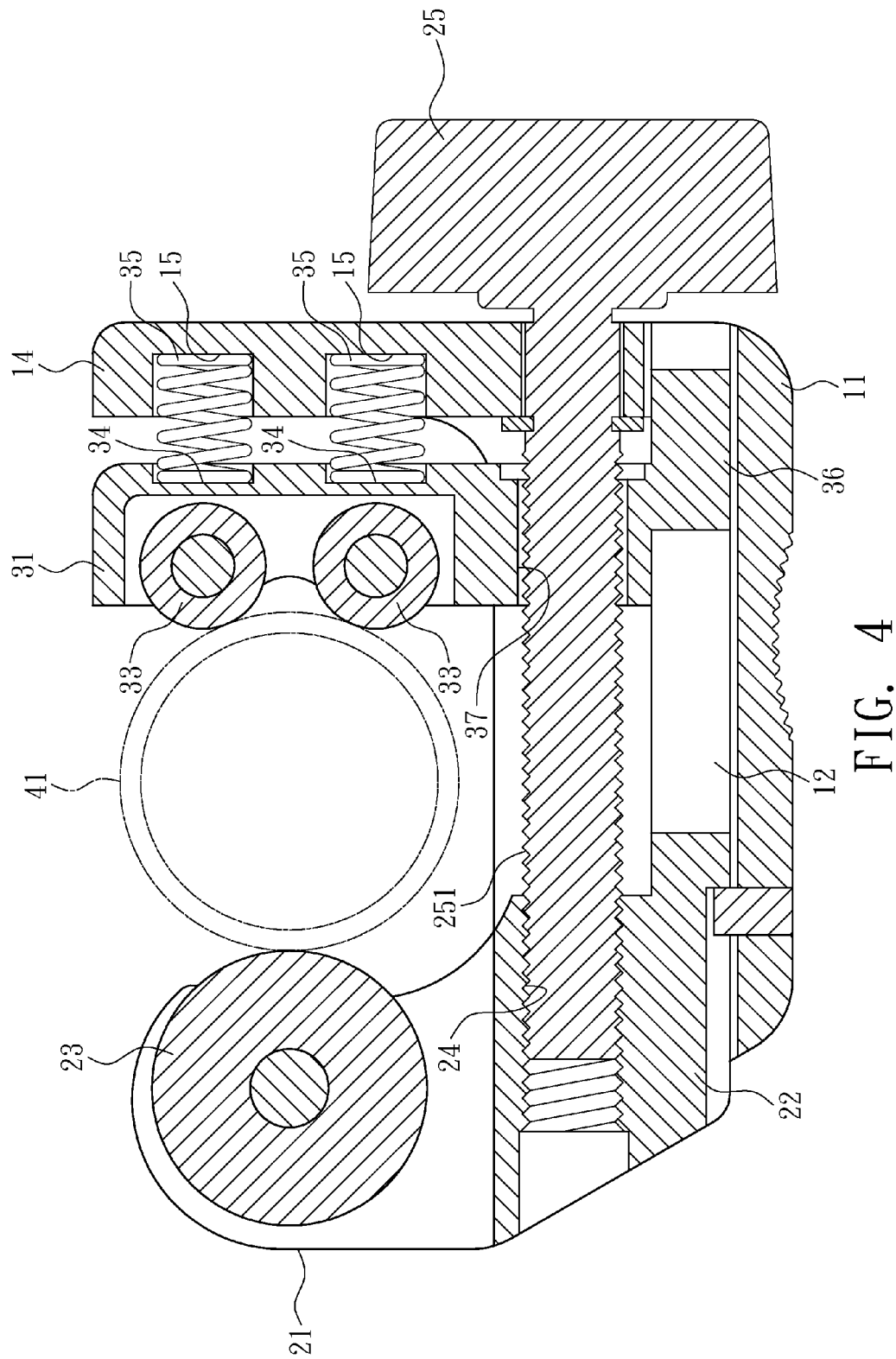
FIG. 4 is a schematic view of the invention in use.
Figure 5:
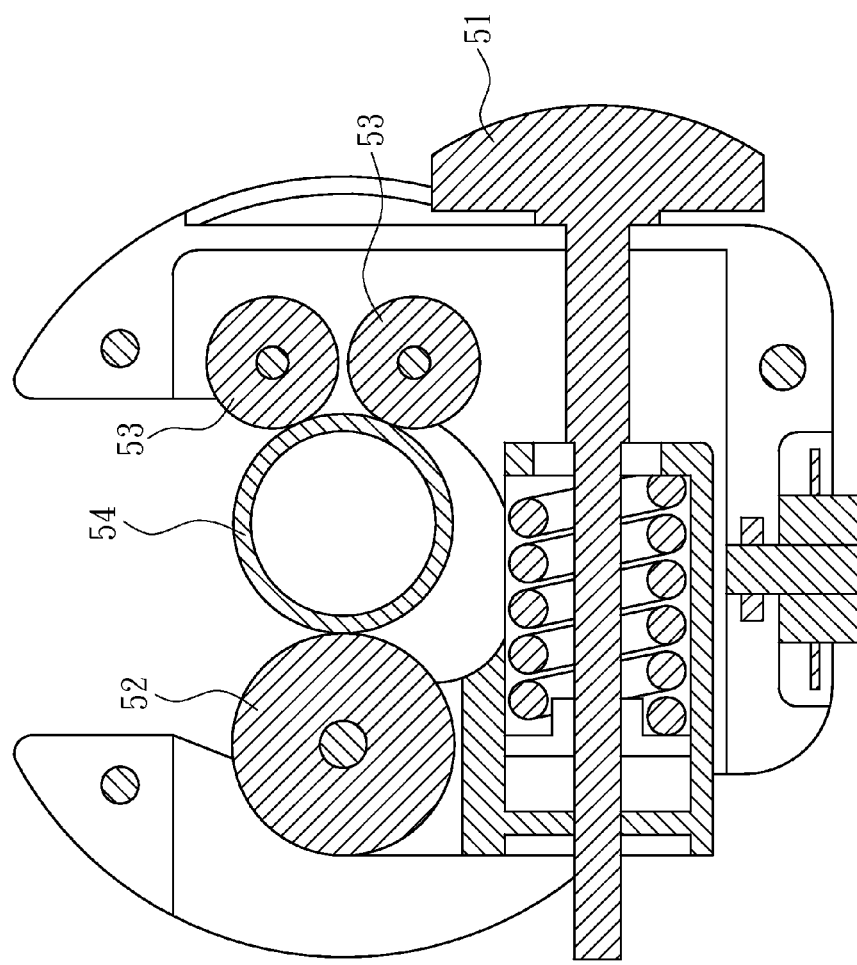
FIG. 5 is a schematic view of a conventional pipe cutter.

Please refer to FIG. 4. In practice, a pipe 41 is inserted between the cutting wheel 23 of the moving base 21 and the rollers 33 of the roller base 31. By turning the transmission element 25, the cutting wheel 23 of the moving base 21 gradually inserts a force toward the roller base 31. The cutting wheel 23 of the moving base 21 and the rollers 33 of the roller base 31, thereby holding onto the outer surface of the pipe 41. Since the roller base 31 is urged by the elastic elements 35, the roller base 31 automatically deviates to a best holding position according to the size of the pipe 41, holding the pipe 41 firmly. Likewise, when the disclosed cutting tool starts to cut the pipe 41, the roller base 31 also automatically deviates to the best holding position according to the imposed force. This can effectively prevents the pipe from slipping off from the space between the cutting wheel 23 and the two rollers 33.

Since the structure of the invention is simple, it has the advantages of low production cost, and easy and fast assembly. When the invention is in use, the roller 31 is urged by the elastic elements 35 to have a restoring force. When the pipe 41 is slightly larger than the span between the cutting wheel 23 and the two rollers 33, one can directly insert the pipe 41 between the cutting wheel 23 and the two rollers 33. The roller base 31 compresses the elastic elements 35 to move backward, thereby holding the pipe 41. Using such a structure, the pipe 41 can be quickly held without turning the transmission element 25.

Although the invention has been described with reference to specific embodiments, this description is not meant to be construed in a limiting sense. Various modifications of the disclosed embodiments, as well as alternative embodiments, will be apparent to people skilled in the art. Therefore, it is contemplated that the appended claims will cover all modifications that fall within the true scope of the invention.

What is claimed is:

1. An improved structure of a cutting tool, comprising:
   a body having a track groove whose one side is extended upward with a stopping wall;
   a moving base mounted in the track groove by the bottom thereof, the moving base having a cutting wheel and connecting to a transmission element to slide along the track groove under a driving force of the transmission element; and
   a roller base disposed between the moving base and the stopping wall, with a plurality of elastic elements disposed between the roller base and the stopping wall, the elastic elements making the roller base to have a relative deviation when imposed by a force, and the roller base having at least two rollers opposite to the cutting wheel.

2. The improved structure of a cutting tool of claim 1, wherein a sliding groove is formed on the two sidewalls of the track groove, respectively; a connecting hole is formed at the position of the roller base opposite to the two sliding grooves; a limiting element is disposed in the two connecting holes, respectively; and the two limiting elements protrude from the corresponding sliding grooves.

3. The improved structure of a cutting tool of claim 1, wherein the bottom of the moving base is formed with a sliding part mounted in the track groove; the moving base has a screw hole along the axial direction of the track groove; the transmission element has an outer thread part corresponding to the screw hole; and the transmission element goes through the stopping wall into the track groove and connects to the screw hole of the moving base.

4. The improved structure of a cutting tool of claim 3, wherein the bottom of the roller base has a connecting part correspondingly mounted in the track groove; the connecting part is formed with a through hole along the axial direction of the track groove; and the transmission element goes through the through hole of the roller base and connects to the screw hole of the moving base.

5. The improved structure of a cutting tool of claim 1, wherein the end surface of the stopping wall facing the track groove is formed with a plurality of recesses; the end surface of the roller base facing the stopping wall is formed with a mounting part corresponding to the recess; one end of the elastic element urges against the recess of the stopping wall, and the other end urges against the mounting part of the roller base.

* * * * *